(12) United States Patent
Schuba et al.

(10) Patent No.: US 8,028,336 B2
(45) Date of Patent: Sep. 27, 2011

(54) INTRUSION DETECTION USING DYNAMIC TRACING

(75) Inventors: Christoph L. Schuba, Menlo Park, CA (US); Dwight Hare, Encinitas, CA (US); Hal Stern, Livingston, NJ (US)

(73) Assignee: Oracle America, Inc., Redwood City, CA (US)

( * ) Notice: Subject to any disclaimer, the term of this patent is extended or adjusted under 35 U.S.C. 154(b) by 1027 days.

(21) Appl. No.: 11/269,775

(22) Filed: Nov. 8, 2005

(65) Prior Publication Data

US 2007/0107058 A1    May 10, 2007

(51) Int. Cl.
- G06F 11/00 (2006.01)
- G06F 12/14 (2006.01)
- G06F 12/16 (2006.01)
- G08B 23/00 (2006.01)

(52) U.S. Cl. ............... 726/23; 726/24; 726/25; 340/541
(58) Field of Classification Search ............ 726/23, 726/25, 22; 340/541; 709/224
See application file for complete search history.

(56) References Cited

U.S. PATENT DOCUMENTS

| | | | | |
|---|---|---|---|---|
| 3,973,577 | A * | 8/1976 | Bloom | 137/82 |
| 6,735,703 | B1 * | 5/2004 | Kilpatrick et al. | 726/23 |
| 6,968,547 | B2 | 11/2005 | Cantrill | |
| 6,973,577 | B1 * | 12/2005 | Kouznetsov | 726/25 |
| 7,007,301 | B2 * | 2/2006 | Crosbie et al. | 726/23 |
| 7,188,368 | B2 * | 3/2007 | Swimmer et al. | 726/24 |
| 7,296,274 | B2 * | 11/2007 | Cohen et al. | 719/315 |
| 7,340,777 | B1 * | 3/2008 | Szor | 726/26 |
| 7,716,335 | B2 * | 5/2010 | Dinker et al. | 709/226 |
| 2004/0205474 | A1 * | 10/2004 | Eskin et al. | 715/500 |
| 2005/0273858 | A1 * | 12/2005 | Zadok et al. | 726/24 |
| 2006/0259830 | A1 * | 11/2006 | Blevin et al. | 714/45 |
| 2007/0078915 | A1 * | 4/2007 | Gassoway | 707/205 |
| 2007/0079178 | A1 * | 4/2007 | Gassoway | 714/38 |
| 2007/0079373 | A1 * | 4/2007 | Gassoway | 726/22 |

OTHER PUBLICATIONS

C. Warrender, S. Forrest, B. Pearlmutter, "Detecting Intrusions using System Calls: Alternative Data Models," sp, pp. 0133, 1999 IEEE Symposium on Security and Privacy, 1999.*

Rutkowska J.; Thoughts about Cross-View based Rootkit Detection; Jun. 2005, http://www.invisiblethings.org/papers/crossview_detection_thoughts.pdf (linked Jan. 22, 2010).*

(Continued)

*Primary Examiner* — Eleni A Shiferaw
*Assistant Examiner* — Jing Sims
(74) *Attorney, Agent, or Firm* — Osha • Liang LLP

(57) ABSTRACT

Techniques have been developed whereby dynamic kernel/user-level tracing may be employed to efficiently characterize runtime behavior of production code. Using dynamic tracing techniques, user space or kernel instruction sequences between system calls may be instrumented without access to source code. In some realizations, instrumentation may be interactively specified on a host system. In some realizations, instrumentation specifications may be supplied as functional definitions (e.g., as scripts and/or probe definitions) for installation on a host system. Using the developed techniques, data states, parameters passed and/or timing information may be sampled to provide more detailed insight into actual program behavior. In signature-oriented exploitations, more powerful intrusion signatures are possible. In anomaly-oriented exploitations, a more detailed "sense of self" may be developed to discriminate between normal and anomalous program behavior.

10 Claims, 4 Drawing Sheets

OTHER PUBLICATIONS

Busleiman A.; Detecting and Understanding Rootkit, an Introduction and just a little-bit more; Year 2003; http://www.net-security.org/dl/articles/Detecting_and_Understanding_rootkits.txt (linked on Jan. 22, 2010).*

Cantrill, Bryan M. et al., "Dynamic Instrumentation of Production Systems", Proceedings of the General Track: 2004 USENIX Annual Technical Conference, Jun. 27-Jul. 2, 2004, pp. 15-28, Copyright 2004 by the USENIX Association, Berkeley, CA.

Forrest Stephanie et al., "A Sense of Self for Unix Processes", In Proceedings of the 1996 IEEE Symposium on Security and Privacy, May 6-8, 1996, pp. 120-128, Copyright 1996 IEEE Computer Society Press, Los Alamitos, CA, DOI 10.1109/SECPRI.1996.502675.

Warrender, Christina et al., "Detecting Intrusions Using System Calls: Alternative Data Models" In 1999 IEEE Symposium on Security and Privacy, pp. 133-145, IEEE Computer Society, DOI 10.1109/SECPRI.1999.766910.

Cort, Alexis, "Algorithm-based approaches to intrusion detection and response" SANS Infosec Reading Room, pp. 1-16, Mar. 16, 2004, Copyright SANS Institute 2004.

Ho, Swee Yenn (George), "Intrusion Detection—Systems for today and tomorrow", SANS Infosec Reading Room, pp. 1-6, Sep. 5, 2001, Copyright SANS Institute 2001.

Holland, Ted, "Understanding IPS and IDS: Using IPS and IDS together for Defense in Depth", SANS Infosec Reading Room, pp. 1-12, Feb. 23, 2004, Copyright SANS Institute 2004.

Aupperle, J.D., "Running a World Class Intrusion Detection Program—More Than Just Picking the Right Tool", SANS Infosec Reading Room, pp. 1-14, Mar. 2, 2004, Copyright SANS Institute 2004.

Eanes, Mark, "Wanted Dead or Alive: Snort Intrusion Detection System", SANS Infosec Reading Room, pp. 1-19, Oct. 15, 2003, Copyright SANS Institute 2003.

Lindqvist, Ulf et al., "eXpert-BSM: A Host-based Intrusion Detection Solution for Sun Solaris", In Proceedings of the 17th Annual Computer Security Application Conferences, pp. 240-251, New Orleans, LA, Dec. 10-14, 2001, published by the IEEE Computer Society.

Snort Users Manual 2.4.0, The Snort Project, Aug. 30, 2005, 48 pages, Copyright 1998-2003, Martin Roesch, Copyright 2001-2003, Chris Green, and Copyright 2003-2005 Sourcefire, Inc.

Schuba, Christoph et al., "Integrated Network Service Processing Using Programmable Network Devices", Sun Labs, SMLI TR-2005-138, May 2005, pp. 1-27, Sun Microsystems, Menlo Park, CA.

"Solaris Dynamic Tracing Guide", Part No. 817-6229-11, Jan. 2005, Sun Microsystems, Inc., Santa Clara, CA.

U.S. Appl. No. 11/207,341, filed Aug. 19, 2005 and naming as inventor(s) Christoph L. Schuba, Dwight F. Hare and Gabriel E. Montenegro.

* cited by examiner

INTRUSION DETECTION USING DYNAMIC TRACING

FIELD OF THE INVENTION

The present invention relates generally to computer security, and more particularly, to techniques for instrumenting programs to facilitate detection of anomalous and/or malicious behavior.

DESCRIPTION OF THE RELATED ART

The vulnerability of computer systems, configurations, software and information codings and protocols to unauthorized access or use is widely recognized, at least by information security professionals. These vulnerabilities range from minor annoyances to critical national security risks. Today, given the ubiquitous nature of internet communications and the value of information and transactions hosted on the public internet, vulnerabilities are discovered and exploited at alarming rates. Automated tools facilitate the probing of systems and discovery of vulnerable systems and configurations. Once vulnerabilities are identified, exploits can be globally disseminated and rapidly employed.

Computer security typically begins with at least a baseline of hardware systems, software systems, security policies and access controls designed to impede unauthorized use of systems and/or access to information. Unfortunately, vulnerabilities exist in most complex systems. Patches (or updates) seek to address known vulnerabilities. However, even after vulnerabilities and/or exploits are identified and patches created, vulnerabilities persist in many system or software instances because patches are not universally distributed or installed. In some cases, users and administrators are simply unaware of the vulnerabilities or patches. In some cases, the flux of security patches or number of systems requiring update can be daunting, frustrating or overwhelming even for the most vigilant of users or administrators. In some cases, patches themselves have been known to create new problems, vulnerabilities or incompatibilities. As a result, many users and organizations prefer not to be early adopters of patches, even those that purport to address critical security risks. Unfortunately, even systems designed for security and patched to address the latest known threats can be vulnerable to as-yet unrecognized threats. Furthermore, security postures are often subverted through poor user (or administrator) practices.

Intrusion detection systems are based on the recognition that even the best protective measures may turn out to be inadequate or may be subverted in practice. Accordingly, intrusion detection techniques are often employed as part of a layered defense and seek to identify markers for intrusions, thereby facilitating appropriate responses.

A wide range of intrusion detection techniques have been proposed and intrusion detection systems are widely employed by security professionals, but as a general proposition, intrusion detection techniques and systems can be grouped according to two primary detection models. Some systems seek to detect misuse by looking for activity that corresponds to known attack vectors, exploits or vulnerabilities. Such systems tend to presuppose a signature (direct or indirect) of intrusion that may be detected by monitoring system activity, processing logs, inspecting traffic or accesses, etc. Other systems do not rely upon intrusion-specific signatures, but rather seek to identify system and/or user behavior that is anomalous in that it departs from expected behavior. In general, expectations may be shaped by design expectations or historical observations, but statistical methods are typically employed to identify anomalies based on execution trace data. Of course, dual-mode or hybrid detection models may also be employed.

In general, signature-oriented detection strategies can precisely target known threats, but may perform poorly as new threats emerge. On the other hand, anomaly-oriented detection strategies, while better structured to detect emerging threats, can be difficult to configure and can exhibit high levels of false positives as legitimate system and user activity changes over time or as a result of configuration, load or other changes. Intrusion detection strategies can be employed at a number of high leverage points in modern networked computer systems. For example, network-based intrusion detection systems scan network traffic at strategic points in a network topology, while host-based intrusion detection systems typically monitor system, event and/or log information in a computer system.

In theory, host-based approaches offer the greatest potential for direct observations of program behavior. However, in practice, overhead can limit host-based intrusion detection techniques to very simple observations, particularly when employed in interactive production systems and real-time (or near real-time) detection. As a result, characterizations of system/user behavior employed in a definition of "anomaly" (or "signature") are typically based on information that is readily available with little or no additional overhead (e.g., from system logs) or using rudimentary tracing mechanisms. Commercially-available intrusion detection systems or devices (such as open source Snort IDS software, NFR Security's Sentivist IDS or Cisco Systems' IDS 4200 series appliances) tend to be signature-oriented, while anomaly detection is largely the subject of research projects (see e.g., Warrender, Forrest and Pearlmutter, Detecting *Intrusions Using System Calls: Alternative Data Models*, in proceedings for the 1999 IEEE Symposium on Security and Privacy, pp. 133-145 (1999); Forrest, Hofmeyr, Somayaji and Longstaff, *A Sense of Self for Unix Processes*, in proceedings for the 1996 IEEE Symposium on Security and Privacy, pp. 120-128 (1996); and Lindqvist and Porras, *eXpert-BSM: A Host-based Intrusion Detection Solution for Sun Solaris*, in Proceedings of the 17th Annual Computer Security Applications Conference, pages 240-251, New Orleans, La., (Dec. 10-14, 2001)).

SUMMARY

Despite their theoretical promise, host-based intrusion detection systems have been limited in practice because facilities have not existed to instrument production code in ways that are both descriptive of detailed program behavior and of sufficiently low overhead to support real-time (or near real-time) intrusion detection in interactive systems. For signature-oriented systems, this absence of practical instrumentation options tends to limit possible intrusion signatures. For anomaly-oriented detection strategies, the absence of practical fine-grained instrumentation facilities tends to limit program behavior baselines and trace information to comparatively less powerful characterizations of program behavior such as system call sequences or resource utilization patterns.

Recognizing these and other limitations of conventional approaches, we have developed techniques whereby dynamic kernel/user-level tracing may be employed to efficiently characterize runtime behavior of production code. Using dynamic tracing techniques, user space or kernel instruction sequences between system calls may be instrumented without access to source code. In some realizations, instrumentation may be interactively specified on a host system. In some realizations, instrumentation specifications may be supplied as functional definitions (e.g., as scripts and/or probe definitions) for installation on a host system. Using the developed techniques, data states, parameters passed and/or timing information may be sampled to provide more detailed insight into actual program behavior. In signature-oriented exploitations, more powerful intrusion signatures are possible. In anomaly-oriented exploitations, a more detailed "sense of self" may be developed to discriminate between normal and anomalous program behavior.

BRIEF DESCRIPTION OF THE DRAWINGS

The present invention may be better understood, and its numerous objects, features, and advantages made apparent to those skilled in the art by referencing the accompanying drawings.

FIG. 1 illustrates a scenario generally consistent with a signature detection approach.

FIG. 2 illustrates a scenario generally consistent with an anomaly detection approach.

The use of the same reference symbols in different drawings indicates similar or identical items.

DETAILED DESCRIPTION

Figure 1:
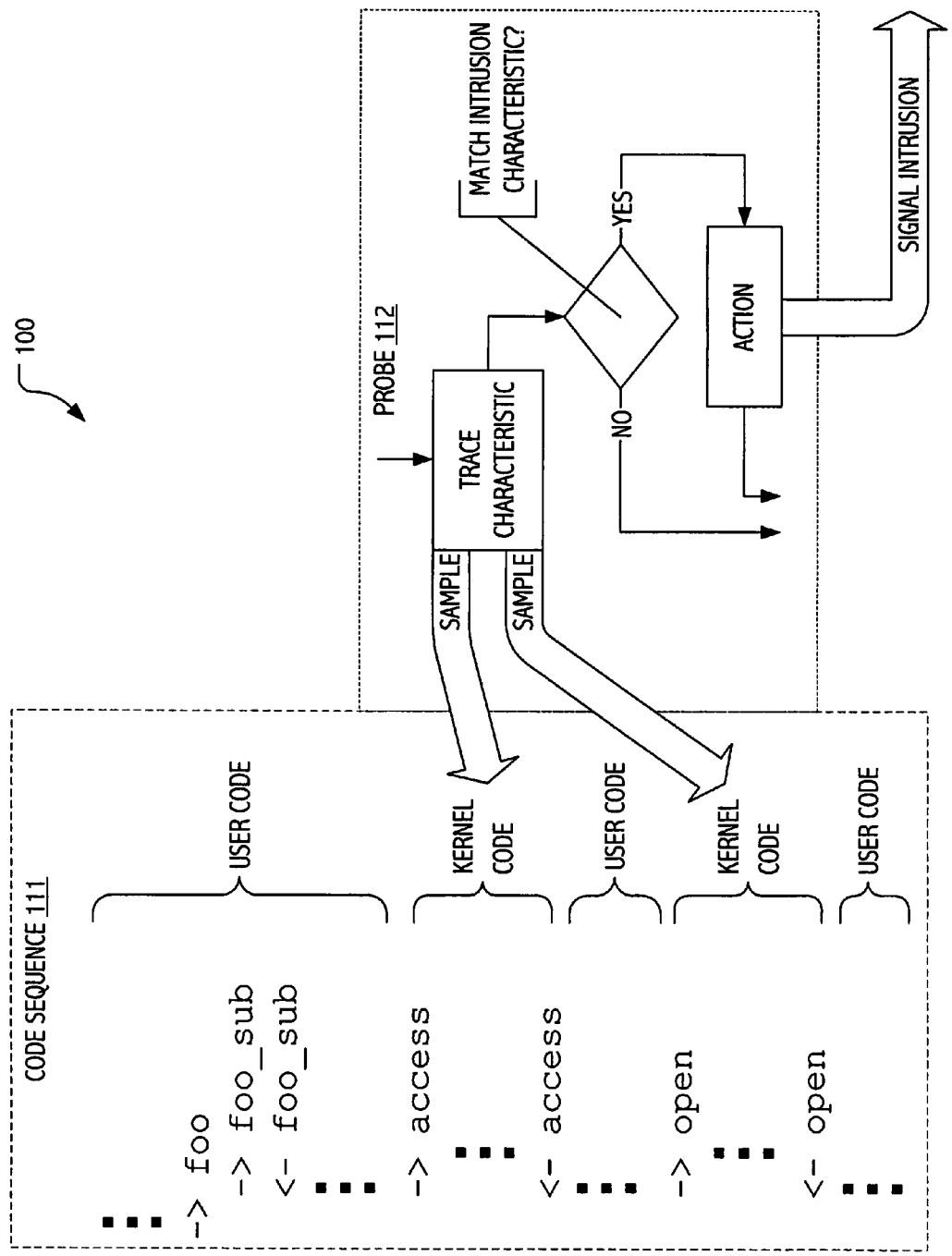
FIGS. 1 and 2 graphically depict relationships between respective illustrative code sequences executing (or executable) on a computer and associated probes for use in detecting an intrusion in accordance with some embodiments of the present invention.

The description that follows presents certain illustrative embodiments of a computer security technique that employs dynamic tracing to instrument code, typically production code, without requiring access to source code, indeed without requiring recompilation or even restart of the code to be instrumented. We employ a dynamic tracing environment called DTRACE (available from Sun Microsystems, Inc. with implementations of the SOLARIS 10 Operating Environment) to dynamically instrument code in ways previously not achievable and exploit certain dynamically introduced instrumentation to facilitate signature-oriented and/or anomaly-oriented intrusion detection strategies described herein. SOLARIS is a trademark of Sun Microsystems, Inc. in the United States and other countries.

While facilities and operational attributes of a DTRACE dynamic tracing environment make it a particularly attractive environment in which to implement some of our techniques, exploitations of the present invention are not limited to DTRACE-based dynamic tracing. Rather DTRACE dynamic tracing, together with its terminology base, DTrace D programming language support, user documentation (including the The Solaris Dynamic Tracing (DTrace) Guide, ISBN: 0595285481 (January 2005)), and open source community code base, provide a rich and enabling framework in which to make and use exploitations of the inventions described herein. For concreteness, and without limitation, we illustrate example probes coded at least partially in accordance with D programming language syntax.

Our techniques are generally applicable to many classes of vulnerabilities and we describe our methods broadly. However, for clarity of description we focus in certain illustrative threat scenarios and practical realizations. For example, we draw upon a relatively simple time-of-check-to-time-of-use (TOCTTOU) type race condition vulnerability to illustrate certain aspects of some applications of our techniques. Of course our techniques are not limited to the particular scenario and vulnerability illustrated. Indeed, based on the description herein persons of ordinary skill in the art will appreciate applications to a wide variety of vulnerabilities and intrusion scenarios.

It is convenient to explain some of our techniques in the context of user code that employs system calls. Indeed, many vulnerabilities involve malicious use of system calls, particularly in setuid programs. Accordingly, many realizations of techniques in accordance with the present invention employ probe technology that allows us to instrument beyond the kernel code boundary, i.e., to instrument kernel code execution sequences, as well as sequences that include user code portions. In this way, we are able to improve the sensitivity of intrusion signatures, detect anomalous behaviors at a deeper level and/or, in some cases, identify intrusion signatures or trace characteristics that are simply not apparent in user-level trace data (including system call sequences). However, despite the potential advantages instrumentation beyond the kernel code boundary, exploitations in accordance with some embodiments of the present invention may also employ our techniques for tracing execution of user code.

Finally, the techniques of the present invention may be employed in a wide variety of contexts, including code that implements services, applications, operating system components, firmware, protocol stacks, libraries, plug-ins, applets etc. For purposes of illustration only, we focus on system calls typical of a SOLARIS or Unix-type operating environment. However, based on the description herein, persons of ordinary skill in the art will appreciate exploitations and/or adaptations for the particulars of other systems and operating environments.

Accordingly, in view of the above, and without limitation we now describe certain illustrative embodiments in accordance with the present invention.

Illustrative Probe Definition

We begin with an illustration of an exemplary threat/intrusion scenario. In a typical Unix-type operating system, the following C-style code, when used in a setuid program, exhibits a time-of-check-to-time-of-use (TOCTTOU) type race condition vulnerability.

```
1       if (access(file, R_OK) != 0) {
2           exit(1);
3       }
4       fd = open(file, O_RDONLY);
5       // do something with fd...
``` where use of the system call, access ( ), in line 1 is intended to check whether the real user who executed the setuid program would normally be allowed to read the target specified by the pathname, file. That is, access ( ) checks the real userid rather than effective userid. Because the two system calls, access ( ) and open ( ), are performed sequentially, it is possible exploit a change in state after access ( ) performs its user check but before open ( ) opens the target in line 4.

In short, the program sequence is vulnerable to the following attack:
1. Create a file that the user has permission to read. The file appears in the file system at a location corresponding to the pathname file.
2. Cause execution of the vulnerable code sequence, e.g., by running a program, calling a function, invoking a service, etc.

3. Change the file to a symbolic link that instead points to another file that the user should not be able to access.

Although the exploit requires precise timing, it is often possible for an attacker to arrange such conditions without too much difficulty. Persons of ordinary skill in the art will recognize that, from a security perspective, the access ( ) system call, as it currently exists in Unix, should not generally be used. However, despite the vulnerability, production code can often include this or other similar vulnerabilities.

While the TOCTTOU vulnerability summarized above is relatively simple, it does not lend itself to detection based on information visible at the user code level. From the user code perspective, a trace of a normal (i.e., non-exploited) execution sequence and an exploit appear identical. However, using kernel-level tracing that may be dynamically introduced using a facility such as dtrace, we are able to identify operation of the exploit.

Since we know that the exploit is based on a sequence that exists when the access ( ) system call is followed by the open ( ) system call that ostensibly targets the same file, we instrument code to accomplish the following. For a given process, when access ( ) is called, we capture an identifier for the file system target accessed. The captured identifier should come from the actual file system inode data structure that corresponds to the calling parameter file. When the open ( ) system call is subsequently invoked, we determine if the last invocation of access ( ) operated on the same inode.

In a typical file system implementation, the term inode usually refers to inodes on block devices that manage files, directories, and symbolic links. An inode number is an integer that is unique (for a particular device) to a particular file, directory or symbolic link. Files are hard links to inodes. Whenever a program refers to a file by name, the system uses the filename to look up the corresponding inode, which gives the system the information it needs about the file to perform further operations. However, the filename to inode conversion occurs within kernel code. Therefore, we need to instrument kernel code that implements the access ( ) and open ( ) system calls.

Using a facility such as dtrace we define a probe that, for a given invocation of the access ( ) system call, stores in a local variable the inode number corresponding to the calling parameter file. Then, when the subsequent open ( ) system call is invoked, a dtrace probe compares the inode number that then corresponds to the parameter file with which open ( ) is called. If the invocation of open ( ) operates on a different inode than the preceding invocation of access ( ), then an exploit is a likely cause. To reduce the impact of our instrumentation, the scope of both probes can be limited to setuid processes.

The following probe pseudocode implements the preceding detection strategy:

```
P1      syscall::access:entry
P2      /thread->suid == TRUE/
P3      {
P4          self->inode = inode(arg1);
P5      }
P6      syscall::open:entry
P7      /thread->suid == TRUE/
P8      {
P9          (defined(self->inode) && self->inode != inode(arg1))
?
P10         raise_hell("Potential TOCTTOU exploitation"); :
P11         undef(self->inode);
P12     }
``` where the first probe (lines P1-P5) fires (on entry) when access ( ) is invoked in the context of a setuid process or thread, i.e., if the predicate (thread->suid==TRUE) holds.

The first probe simply stores in a thread local variable the inode number for the file argument (arg1) with which access ( ) was invoked.

Like the first probe, the scope of the second probe (lines P6-P12) is limited to setuid programs using the illustrated predicate. If the thread-local variable self->inode was previously set (e.g., by the preceding invocation of access ( )), its contents are compared with the inode value for the file argument (arg1) with which open ( ) is invoked. If the thread-local variable is set but codes a different inode number, the probe raises an alarm indicating that a potential TOCTTOU exploitation has been detected. Otherwise, the thread-local variable is reset.

These illustrative probes may generate false positives, e.g., if a program employed an access ( ) . . . open ( ) sequence on different targets such as:

access(file1);
   open(file2);

or false negatives, e.g., if a program purposefully included an open ( ) call for a different file between the offending access ( ) and open ( ) calls. For example, access(file1);
   open(file2);
   open(file1);

However, neither sequence would be considered good programming practice and, if desired, more sophisticated probes could be devised to discriminate the false indications. For example, probes could be tuned to detect non-identical anodes for identical or equivalent file arguments. Probes could also perform checks based on a limited history. In any case, based on the illustration, persons of ordinary skill in the art will appreciate a wide variety of similar intrusion detection strategies that can be developed using an efficient, low-impact and dynamically introducible kernel-level tracing facility such as dtrace to appropriately instrument code.

Probe Introduction and Use

Building on the preceding TOCTTOU vulnerability example and on the preceding description of probes suitable for detection of the illustrated TOCTTOU exploit, we now turn more generally to configurations of systems that may employ the illustrated techniques in an intrusion detection role. FIG. 1 depicts an illustrative code sequence 111 executing (or executable) on a computer and respective probe(s) 112 for use in detecting an intrusion in accordance with some embodiments of the present invention. When probe(s) 112 is (are) enabled, code sequence 111 and probe(s) 112 together constitute instrumented code 100, which executes on one or more processors (not specifically shown). For simplicity, sequences of function calls (->function) and returns (<-function) are illustrated and access and open function calls are identical or substantially equivalent to those previously discussed.

Consistent with our previous description, we sample both the kernel code execution of the access system call and that of the open system call. Based on that sampling of inode information from kernel code state for both system calls, we generate a trace characteristic. In the previously described detection strategy, the trace characteristic can be expressed as correspondence of inode information sampled from kernel code state of the two system calls. That trace characteristic is compared against an exploit signature that, in the previously described detection strategy, is simply non-identity of the sampled inode information. Based on a match, an appropriate action is performed.

Although the trace characteristic in the illustrated case devolves to a Boolean result of the inode comparison and the intrusion characteristic devolves to a particular Boolean value corresponding to mismatch, persons of ordinary skill in the art will recognize that trace characteristics and corresponding intrusion characteristics may be more complex for other detection scenarios. More generally, one or more of the following:

kernel-level activity
    user-level activity
    parameter(s) passed across a user-code/kernel-code boundary
    actual or effective user identity
    data state sampled from kernel and/or user code execution
    execution timing information may contribute to a Boolean, composite, scalar, multivariable or statistical representation of a trace characteristic that may be compared against an intrusion characteristic.

In the illustrated case, signaling of an intrusion follows directly from the intrusion characteristic match; however, more generally additional and/or intermediate actions may be performed in response to the match. For example, additional probes can be enabled or introduced, a security posture can be elevated, logging may be initiated or increased, the offending execution sequence may be terminated or otherwise interdicted, etc.

Figure 2:
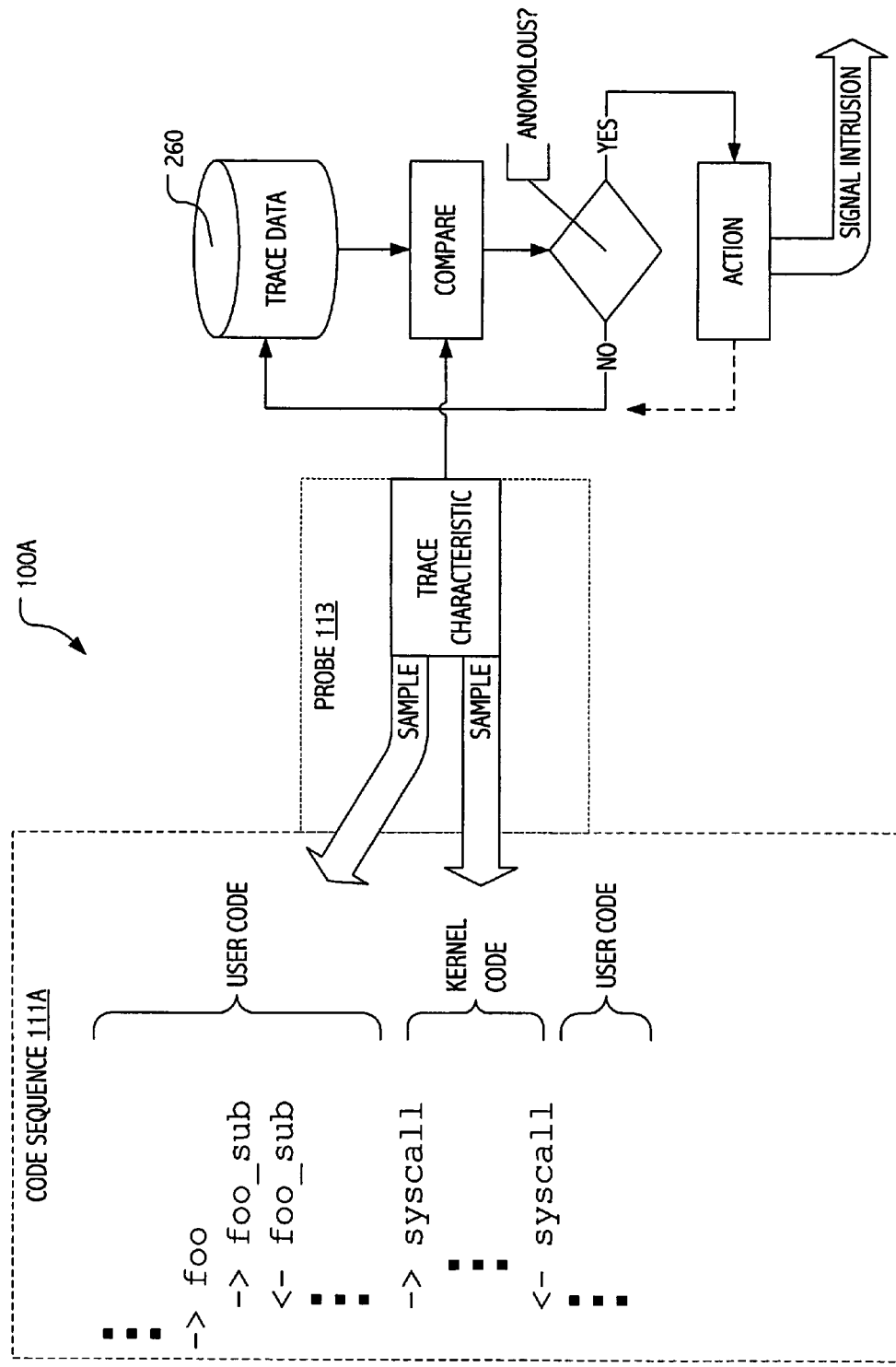

FIG. 2 depicts an illustrative code sequence 111A executing (or executable) on a computer and respective probe(s) 113 for use in detecting an intrusion in accordance with additional embodiments of the present invention. When probe(s) 113 is (are) enabled, code sequence 111A and probe(s) 113 together constitute instrumented code 100A, which executes on one or more processors (not specifically shown). FIG. 2 illustrates a scenario generally consistent with an anomaly detection approach. In the illustrated case, information is sampled from execution of both user code and kernel code, although particular sampling strategies may be implementation- and/or deployment-dependent.

As before, the complexity of generated trace characteristics may vary depending on the application or deployment. One or more of kernel-level activity, user-level activity, parameter(s) passed across a user-code/kernel-code boundary, actual or effective user identity, data state sampled from kernel and/or user code execution, and execution timing information may contribute to a Boolean, composite, scalar, multivariable or statistical representation of a trace characteristic. In typical anomaly-based intrusion detection exploitations based on techniques of the present invention, comparison of such a trace characteristic with historical or baseline trace data (e.g., trace data 260) is performed. Any of a variety of statistical methods may be employed in making the comparison.

Dynamic Tracing

Figure 3:
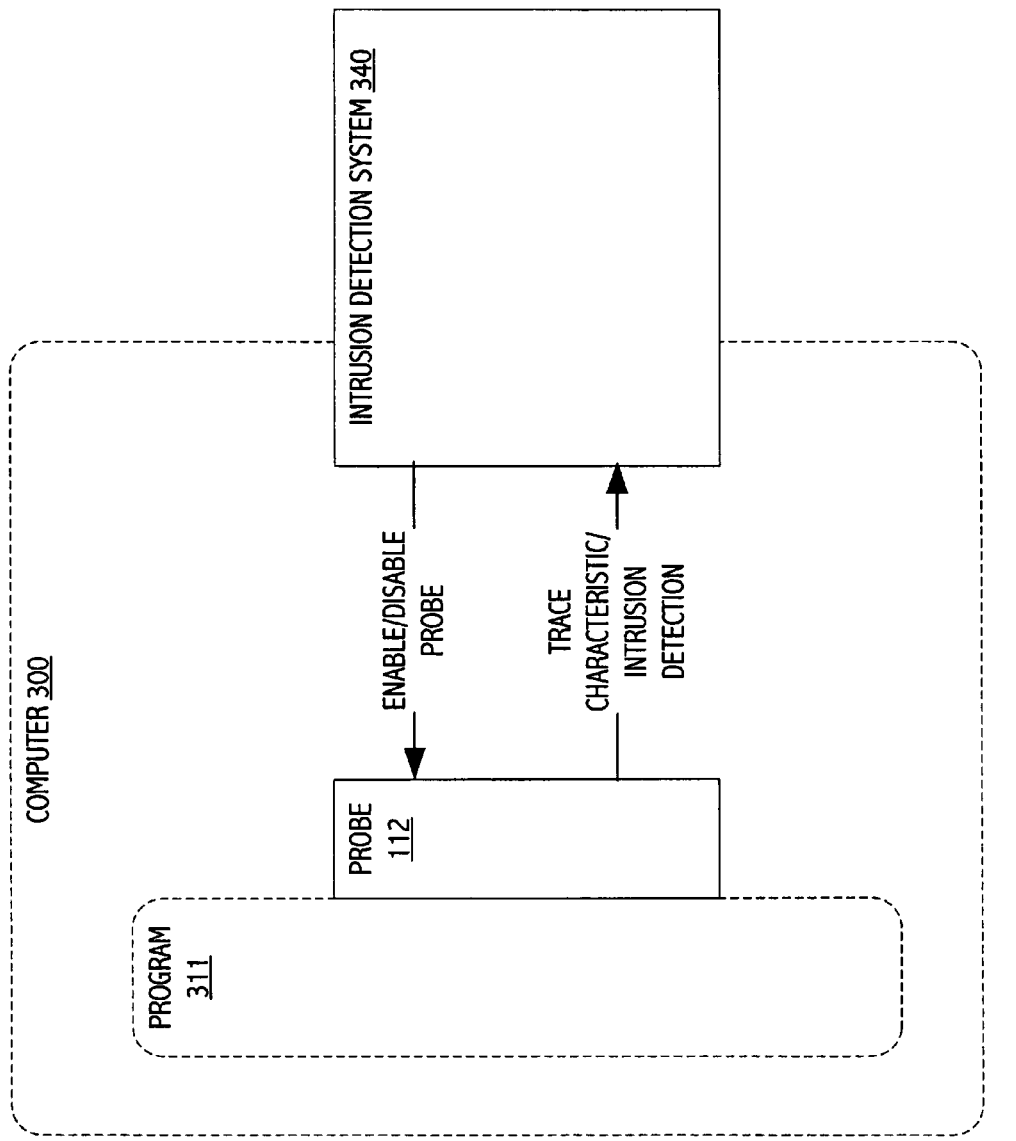
FIG. 3 illustrates selective enable/disable of probe technology as part of an intrusion detection system.

Turning now to FIG. 3, we illustrate probe 112 enabled (and potentially disabled) under control of intrusion detection system 340. As before, probes suitable for execution using dtrace facilities provided with the SOLARIS 10 operating environment are illustrative and advantageously allow such a system to be deployed with zero disabled probe impact. However, other dynamically introducible tracing facilities may be employed. Though desirable, negligible or zero probe impact on performance or operation of program 311 executing on computer 300 is not essential for all exploitations of techniques of the present invention.

In some exploitations, intrusion detection system 340 (including constituent or adjunct probe(s) 112) partly or primarily implements a host-based intrusion detection strategy and executes at least partially on computer 100 with program 311. However, in some exploitations, portions of intrusion detection system 340 may reside elsewhere, such as on another computer system networked or otherwise in communication with computer 100.

Probe Definition and/or Delivery Mechanisms

Figure 4:
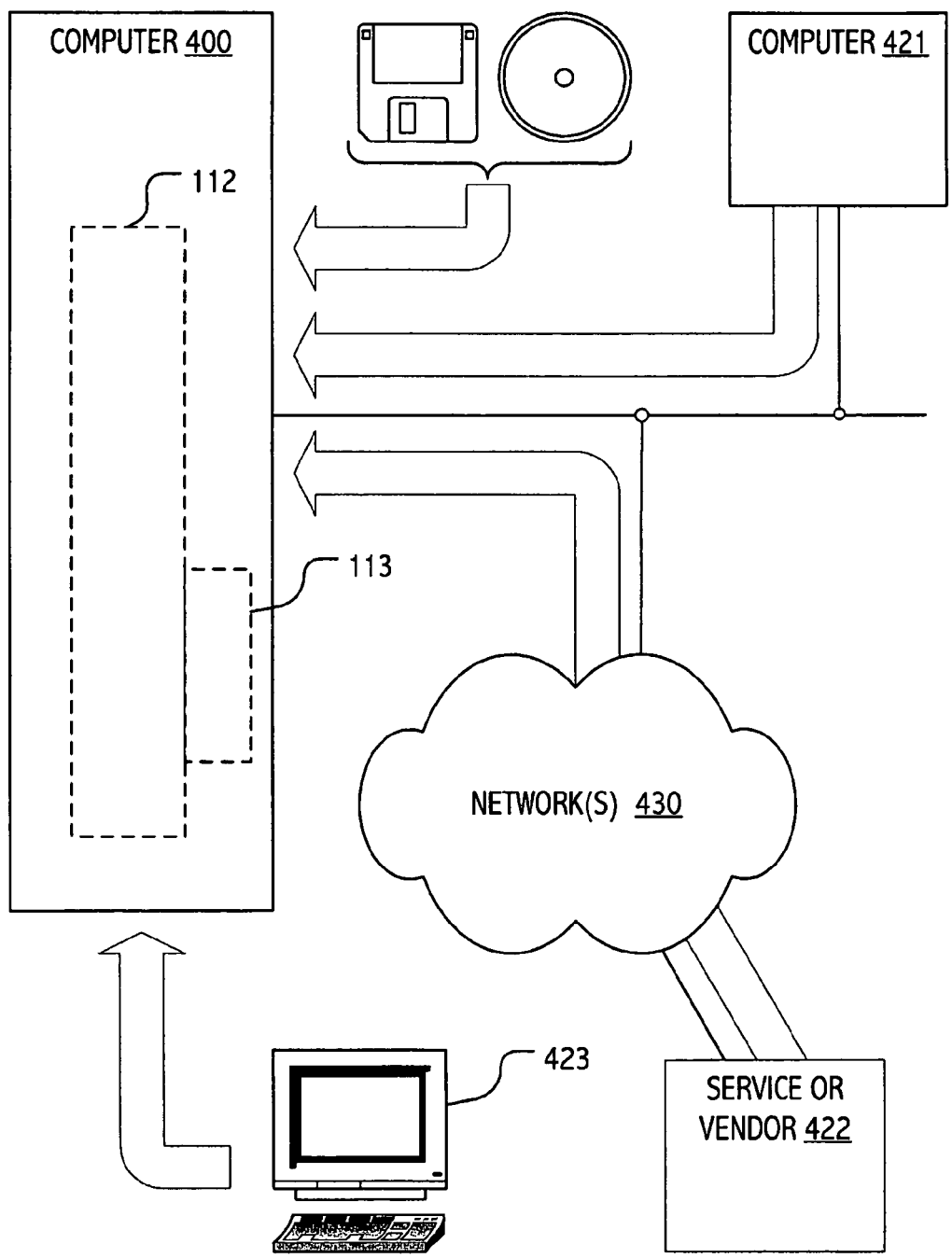
FIG. 4 illustrates a variety of delivery mechanisms/vectors for probe codings in accordance with some embodiments and/or exploitations of the present invention.

While we have generally assumed existence at the point of vulnerability (and/or exploit) of probe code suitable for the signature-based or anomaly-based intrusion detection strategies described herein, it should be noted that a variety of probe definition and/or delivery mechanisms may be employed. FIG. 4 illustrates a several definition/delivery mechanisms/vectors for probes. Probes may be interactively defined at a user interface for computer 400 on which instrumented code will be executed. In general, such user interfaces may be local (e.g., console 423) or remote. Alternatively, probe codings may be supplied encoded in one or more tangible media (e.g., magnetic disk, optical storage, etc.) or embodied in signals or protocol traffic conveyed via electromagnetic, optical, acoustic, wireless, wireline or other communication facilities or networks (including data network 430).

In some realizations, probes may be prepared and/or deployed within an enterprise from computers (e.g., computer 421) of the enterprise. In some realizations, providers or vendors of intrusion detection services or systems (e.g., service or vendor 422) may distribute probes such as described herein as computer program products encoded in tangible media or embodied in signals or protocol traffic. In some cases, probes may be supplied as functional software components suitable for combination with other software or hardware components to at least partially define intrusion detection systems such as described herein.

Other Embodiments

Many variations, modifications, additions, and improvements are possible. For example, while applications to particular vulnerabilities and computing environments have been described in detail herein, applications to other vulnerabilities and to other environments and implementations will also be appreciated by persons of ordinary skill in the art. For example, while comparatively simple vulnerability scenarios and intrusion detection techniques have been used to simplify description of our techniques, more subtle and complex security flaws may be addressed and more sophisticated intrusion detection techniques may be employed in ways that employ the techniques described herein. In general, the concept of "intrusion" includes inappropriate, incorrect or anomalous activity, whether initiated or controlled from inside or outside a system. Some intrusion strategies are non-invasive, employing vulnerable facilities of a system as they exist and seeking to minimize a signature or footprint, while others may introduce code or data into a vulnerable system to allow or facilitate an exploit.

Plural instances may be provided for components, operations or structures described herein as a single instance. Similarly, boundaries between various components, operations and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the claims.

What is claimed is:

1. A computer readable encoding comprising software instructions, which when executed perform a method, the method comprising:
    compiling a program comprising at least one disabled probe to obtain a compiled program;
    executing the compiled program comprising the at least one disabled probe, wherein the at least one disabled probe does not collect information;
    enabling the at least one disabled probe within the compiled program to obtain at least one enabled probe;
    executing the compiled program comprising the enabled probe;
    collecting, by the at least one enabled probe during the executing the compiled program comprising the enabled probe, information related to parameters passed across a user-code/kernel code boundary of a computer system executing the program;
    generating a first trace characteristic using at least a portion of the information, wherein the first trace characteristic comprises information about a kernel code state of at least two system calls; and
    detecting an intrusion indication for the computer system, by comparing the first trace characteristic to a second trace characteristic,
    wherein the computer readable encoding is embodied in at least one physical computer readable medium selected from a group consisting of a magnetic storage medium, an optical storage medium, a semiconductor storage medium, and an electronic storage medium.

2. The computer readable encoding of claim 1, combined with a dynamic tracing facility to at least partially define an intrusion detection system.

3. The computer readable encoding of claim 1,
    wherein the at least one enabled probe is further configured to sample at least one selected from a group comprising user identity (UID), data state, and timing information.

4. The computer readable encoding of claim 1,
    wherein the at least one enabled probe is further configured to characterize user-level activity of a software system.

5. The computer readable encoding of claim 1,
    wherein the second trace characteristic corresponds to a baseline characteristic generated for the computer system under conditions believed to be substantially free of intrusion; and
    wherein the intrusion indication is provided if the first trace characteristic is suggestive of anomalous behavior when compared to the baseline characteristic.

6. The computer readable encoding of claim 1,
    wherein the program is executed on the computer system one or more times under controlled conditions to generate the second trace characteristic.

7. The computer readable encoding of claim 1,
    wherein the second trace characteristic corresponds to an intrusion signature; and
    wherein the intrusion indication is provided if the first trace characteristic is substantially correlated with the intrusion signature.

8. The computer readable encoding of claim 1,
    wherein enabling the at least one disabled probe is at least partially responsive to an escalation of security posture.

9. The computer readable encoding of claim 1,
    wherein the program consists entirely of kernel code.

10. The computer security method of claim 1, embodied in a host-based intrusion detection system deployed in a computer network.

* * * * *